March 22, 1932. A. B. CADMAN 1,850,531
TRAILER VEHICLE
Filed Sept. 7, 1923 3 Sheets-Sheet 1

Inventor
Addi Benjamin Cadman
By Churchill Parker Carlson
Attys

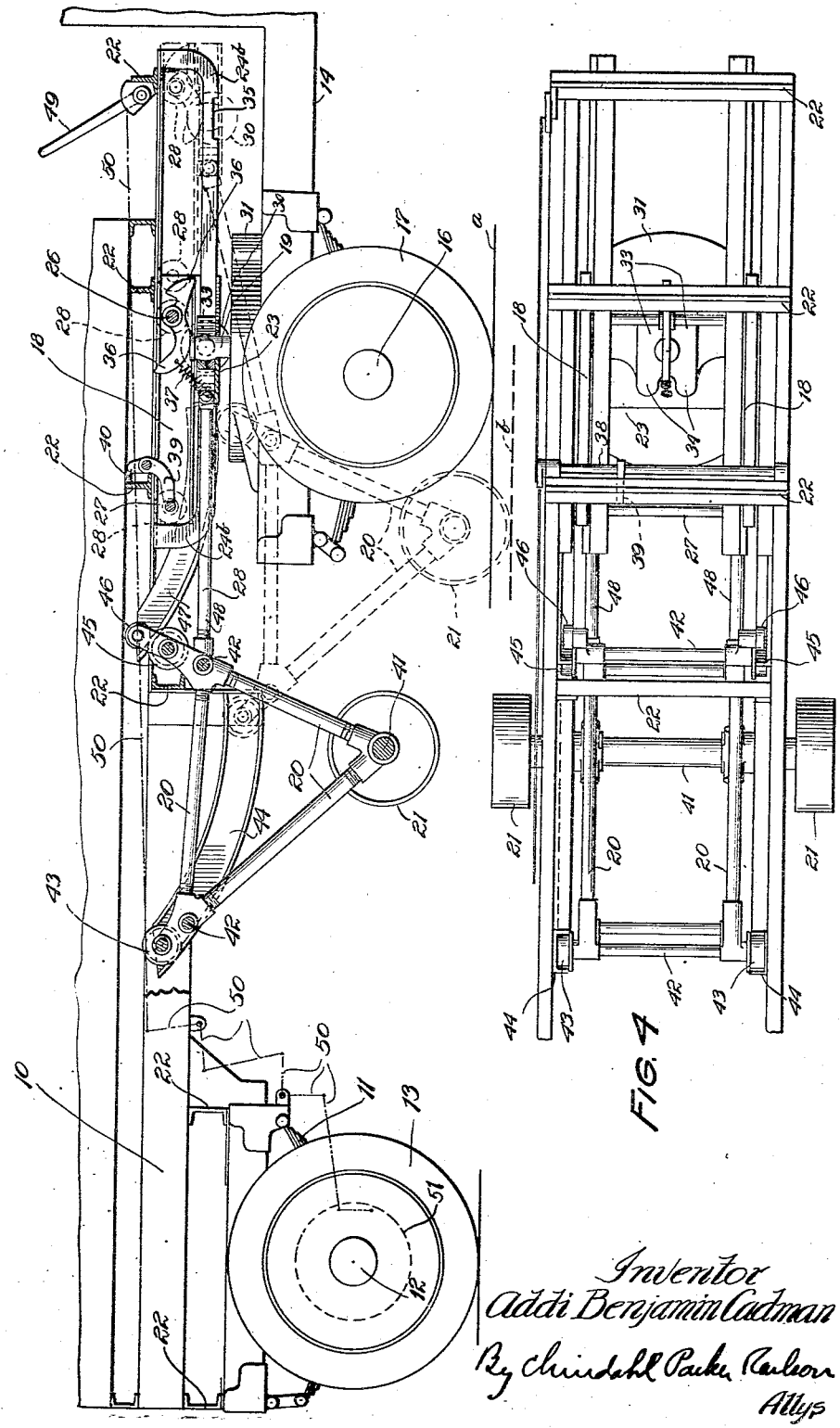

Inventor
Addi Benjamin Cadman
By Churdahl Parker Carlson
Attys

Patented Mar. 22, 1932

1,850,531

UNITED STATES PATENT OFFICE

ADDI BENJAMIN CADMAN, OF BELOIT, WISCONSIN, ASSIGNOR, BY MESNE ASSIGN-
MENTS, TO FRUEHAUF TRAILER COMPANY, OF DETROIT, MICHIGAN, A CORPORA-
TION OF MICHIGAN

TRAILER VEHICLE

Application filed September 7, 1923. Serial No. 661,376.

This invention relates to a combination vehicle including a tractor and a so-called semi-trailer and to novel and improved features of the semi-trailer.

The general objects of the invention are to produce a vehicle in which the load on the trailer will be distributed more evenly over the rear wheels of the tractor and the trailer, so as to enable heavier loads to be carried and effect better traction on the rear tractor wheels; to provide a construction by which the tractor and trailer may be coupled and uncoupled automatically with greater facility and less shock than has been possible with vehicles of this construction heretofore known; to provide supporting means for the forward end of the trailer when detached from the tractor which means is automatically drawn forwardly into position properly to support the forward end of the trailer when the tractor is withdrawn and is automatically moved rearwardly into a position completely out of the way when the tractor is being coupled; to provide means by which the forward end of the trailer will be automatically raised and supported free of the tractor as the latter is being disconnected and will be automatically lowered onto the tractor as the latter is being connected to the trailer; and to accomplish the foregoing in a simple, practical and efficient manner.

Another object is to provide means by which the point of support of the trailer on the tractor is caused to travel forwardly along the trailer as the tractor is being detached, and simultaneously to cause the operation of the means for supporting the trailer from the ground and for elevating the trailer away from the tractor as the tractor is withdrawn, thereby utilizing the power stored up in the rear vehicle springs of the tractor to assist in elevating the trailer.

Further objects and advantages of the invention will be apparent from the following detailed description:

In the accompanying drawings, Figs. 1 and 2 are diagrammatic views illustrating in skeleton a vehicle embodying my invention, Fig. 1 showing the tractor and trailer coupled together ready to be driven, and Fig. 2 showing said elements in the condition which they automatically assume when separated.

Fig. 3 is a side elevation, partly in section, on an enlarged scale, showing the tractor and trailer in coupled relation. The uncoupled position of the trailer supporting means is indicated in dotted outline.

Figs. 4 and 5 are fragmental plan views of the trailer showing the coupler carriage and support in their rearmost and foremost positions respectively.

Preliminary outline of general features

Figure 1:
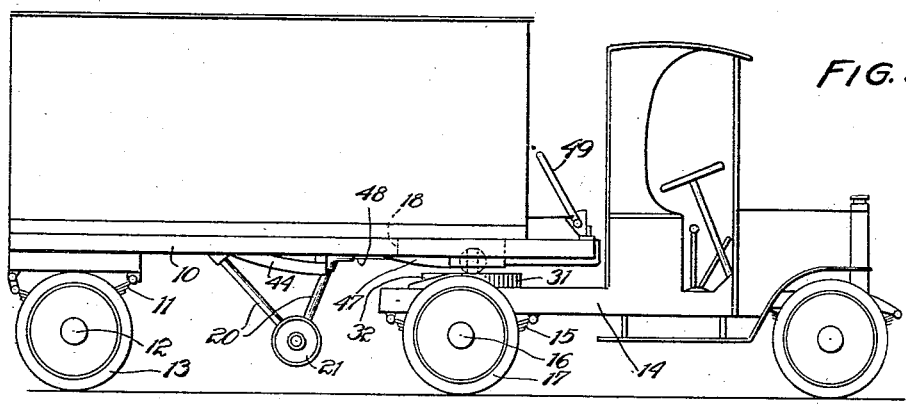
Figure 2:
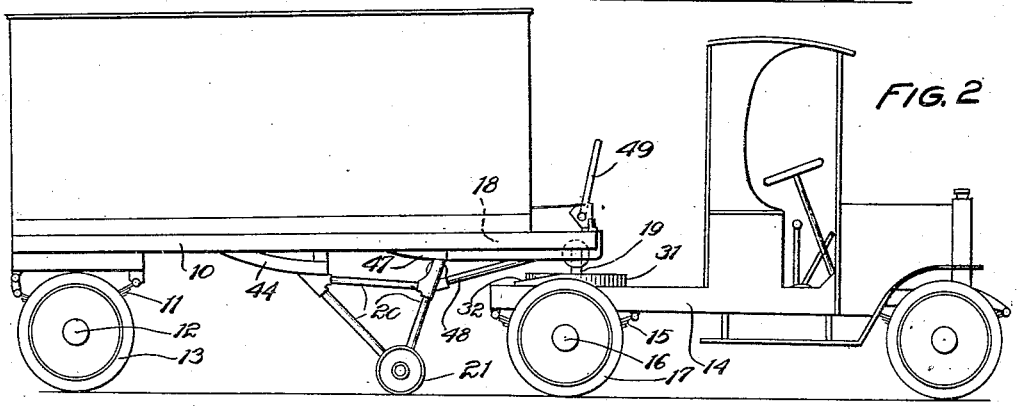
Figure 5:
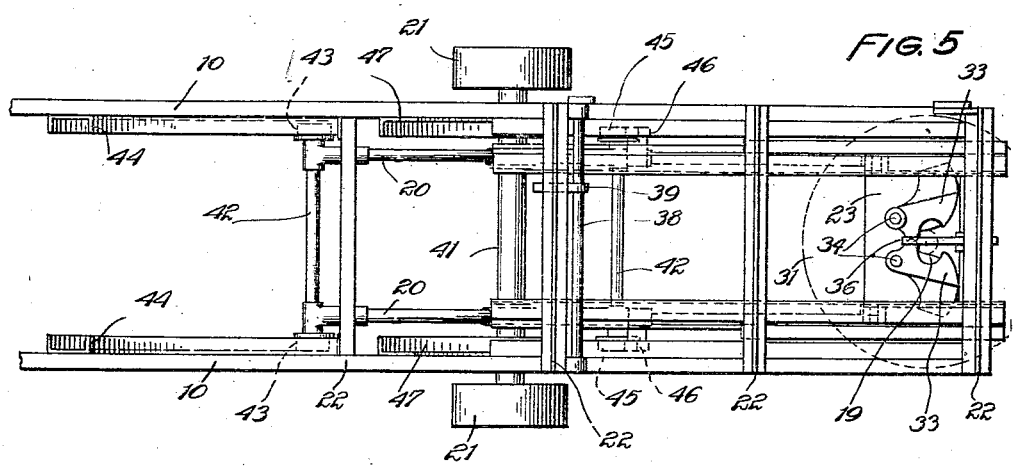
Figure 6:
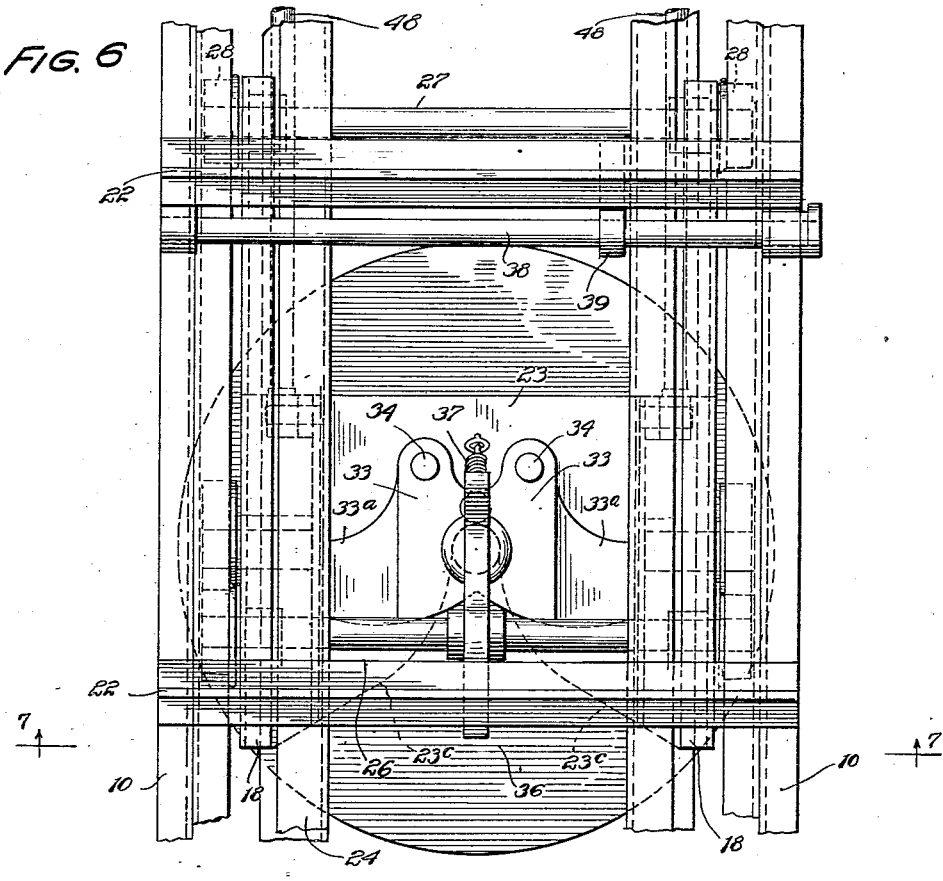
Fig. 6 is an enlarged fragmental plan view illustrating the coupler carriage and the coupling means thereon.
Figure 7:
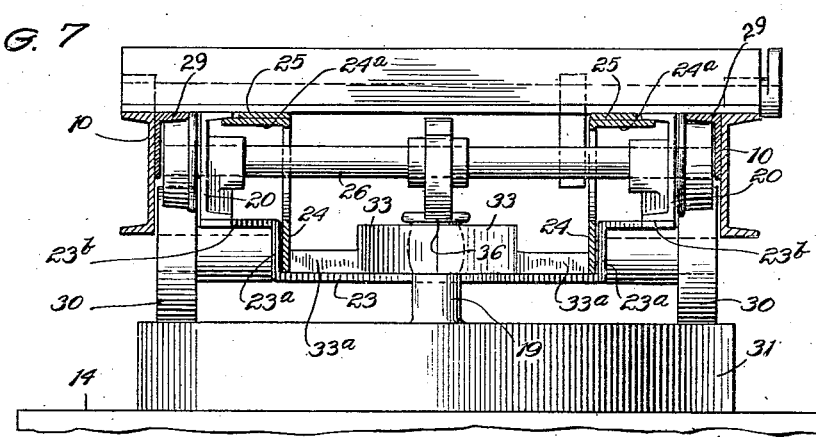
Fig. 7 is a vertical transverse sectional view through the overlapping parts of the connected trailer and tractor frames, the view being taken in the plane of line 7—7 of Fig. 6 and looking in the direction of the arrows.

A brief description of the general construction and mode of operation of my improved vehicle will facilitate an understanding of the more detailed description to follow.

The trailer comprises a body frame 10 which is supported at its rear end by springs 11 upon an axle 12 having wheels 13. The forward end of the trailer when in operative relation overlies and is supported by the rear end of the tractor which comprises the usual body frame 14 supported through springs 15 upon an axle 16 having the usual driving or traction wheels 17 thereon.

The connection between the tractor and trailer comprises a frame or carriage 18 which is mounted on the forward end of the body frame of the trailer and is arranged to slide a limited distance forward and back with respect to the trailer frame. This slidable frame is for convenience termed hereinafter a "coupler carriage," since it carries coupling means which detachably engages an upright stud or king-pin 19 stationarily mounted on the tractor over the rear axle thereof.

The means by which the trailer body-frame is raised or lowered in the operation of detaching or connecting the tractor and trailer comprises a support 20 which is also carried by the trailer frame at the rear of said coupler carriage, the said support being slidably mounted on the trailer frame and being guided by inclined tracks to move forwardly and downwardly, or rearwardly and upwardly, with relation to said trailer frame. The said support which preferably carries land wheels 21 at its lower end, is connected to the said coupler carriage to be drawn forwardly or pushed rearwardly by the latter.

When the tractor is being disconnected from the trailer, brakes on the rear wheels of the trailer are applied and the tractor is then driven out from under the forward end of the trailer. In the movement of the tractor the carriage 18 and the support 20 on the trailer are drawn forwardly together, said support at the same time moving downwardly into engagement with the ground and the inclined tracks thereby causing said support to raise the forward end of the trailer and remove its weight from the tractor. At the end of the forward travel of the coupler carriage the coupling means on said carriage is opened to release the king pin 19 on the tractor so that the latter is free to be driven away, the forward end of the trailer then resting upon said support which bears upon the ground. In this condition the carriage occupies a position at the extreme forward end of the trailer frame.

When the tractor and trailer are to be connected the tractor is backed underneath the trailer until the king pin 19 on the tractor engages the coupling means on the carriage 18, whereupon continued rearward movement of the tractor will move the carriage rearwardly and the support 20 will simultaneously be moved rearwardly and upwardly to lower the forward end of the trailer frame onto the tractor and finally raise the said support clear of the ground. The carriage 18 now occupies a position considerably rearward from the forward end of the trailer frame and the support 20 is, of course, still farther rearward and elevated so that the support is entirely free from obstruction with the rear end of the tractor as the latter is turning corners. Furthermore, the trailer frame projects a considerable distance forwardly of the king pin 19 which is the center of the supporting means on the tractor, so that the load on the trailer frame is distributed more evenly over the tractor wheels and the rear trailer wheels than has been possible with previous vehicles of this type, and this results in better traction of the tractor wheels and greater load capacity of the trailer as a whole.

With the foregoing general description I will now proceed to a detailed description of the particular embodiment of my invention which is illustrated in the drawings. It should be understood, however, that my invention is susceptible of embodiment in many different forms or structures and that the present disclosure is given for the purpose of imparting an understanding of the invention but without any intention to limit the invention to the particular embodiment shown and described. The scope of the invention will be pointed out in the appended claims.

*The slidable carriage and coupling means*

The body frame 10 of the trailer, upon which any desired style of load carrying body may be mounted, is herein shown as comprising two side channel beams having their flanges facing outwardly, said beams being connected at suitable points by cross beams 22 to form a rigid frame.

The carriage 18 comprises two sides, which may be composed of channel irons with their flanges facing inwardly toward each other, and a bottom plate or casting 23 which has its sides extending upwardly and then outwardly to provide guide portions $23^a$ and flanges $23^b$, the latter being secured to the side channels. This carriage 18 is supported in the trailer frame in the present instance by providing stationary guides to underlie the upper flanges of its side channels, thereby supporting the carriage but permitting sliding movement thereof forward and back. In the present instance these guides are provided by two open guide frames 24 extending longitudinally within the trailer frame and being stationarily secured thereto. Each of these guide frames comprises a horizontal strip $24^a$ which is secured to the under sides of the cross beams 22 of the trailer frame, but is spaced from said cross beams by a gib 25 to provide the guideway for the upper flange of one of the side channels of the carriage. Each of the said guide frames also comprises a vertical portion $24^b$ depending from said horizontal strip, said vertical portion being connected by upright arms at its ends to said horizontal strip. The lower bars of these vertical portions lie inside of the upturned guide flanges $23^a$ of the bottom casting of the carriage 18.

The side channels of the carriage are provided with bearings in which are mounted two shafts 26 and 27 extending transversely of the trailer frame and each carrying a pair of rollers 28 on its ends to underlie and engage with a pair of stationary tracks 29 on the trailer frame, said shafts passing through the open space within the guide frames 24. When the trailer is resting on the tractor the weight of the forward part of the trailer is borne by the four rollers 28. The carriage is also provided with a third pair of rollers 30 which run upon a circle 31 that is rigidly mounted on the tractor. This circle 31 has a pair of inclined ways 32 at its rear side up which the rollers 30 may ride during coupling so as to allow the trailer frame to pass over the king pin. Such operation would take place, for example, where the wheels 21 of the trailer when detached happen to rest in a depression in the ground.

The base plate 23 of the carriage 18 has mounted thereon the coupling means to engage with the king pin 19 on the tractor. This coupling means in the present instance comprises a pair of complementary jaws 33 pivoted on vertical axes 34 to the base plate 23 at opposite sides of the longitudinal center line of the trailer, said jaws being adapted to embrace the king pin 19. The forward edge of the base plate 23 has a notch 23ᶜ formed therein with widely flaring sides, the base of the notch being adapted to receive the king pin 19 and being vertically alined with the corresponding apertures in the jaws.

The jaws have thereon wings 33ᵃ which extend outwardly in opposite directions and normally bear against the guide frames 24 so as to hold the jaws in closed position. Near their forward ends the lower bars of the guide frames 24 have notches 35 therein to receive the wings and allow the jaws to spread outwardly and permit the escape of the king pin therefrom. This occurs only when the tractor is to be disconnected from the trailer, at which time the carriage 18 is drawn forwardly by the king pin as the tractor is pulled out from beneath the trailer, as before explained.

Means is provided for automatically locking the carriage 18 in its foremost position and for automatically unlocking the carriage to permit it to be moved rearwardly by the tractor in the connecting operation. This locking means in the exemplary form herein shown comprises a dog 36 pivoted between its ends upon the shaft 26 of the carriage, the forward end of the dog having a notch to engage a stationary part on the front end of the trailer frame. A spring 37 tends to hold the dog in position to engage said part. When the carriage 18 is moved to its foremost position a cam face on the front end of the dog causes the dog to be moved down until the notch is in position to engage said part. The rear end of the dog is arranged to be engaged by the king pin 19 when the tractor is being backed underneath the trailer, so as to disengage the notch from the stationary part of the trailer frame and permit the carriage to be slid rearwardly.

When the carriage 18 is in its rearmost position it is so held by latch means which in the present instance comprises a horizontal rod 38 journaled transversely in the trailer frame and having one or more latches 39 mounted thereon in such position that as the carriage moves rearwardly the shaft 27 in said carriage will engage the latches 39 and raise them out of the way, said latches dropping in front of said shaft when the latter passes. A spring 40 may be employed to hold the latches in their locking position.

*The trailer supporting and elevating means*

The means by which the front end of the trailer frame is raised and supported in elevated position when the tractor is being uncoupled or is lowered into engagement with the tractor when the latter is being backed underneath the trailer comprises the support 20 heretofore mentioned. In the exemplary form herein disclosed this support comprises a pair of vertically disposed triangular frames in the lower corners of which is mounted an axle 41 on which the ground wheels 21 are carried. These two side frames are rigidly connected together and braced by means of a suitable number of cross pieces 42 so as to form a strong unitary support. At the upper rear corners of this support are mounted two rollers 43 which run in inclined tracks 44. These tracks in the present instance are shown in the form of inwardly facing channels rigidly mounted on the trailer framework. At the upper forward corners of the support 20 are also mounted two pairs of co-acting rollers 45 and 46 which engage a pair of inclined tracks 47 also rigidly mounted on the trailer frame. These latter tracks are herein shown as angular or L-shaped in cross-section, the pair of rollers at each side of the support embracing the lateral flange of the track. The forward end portions of the tracks 44 and 47 are substantially horizontal so that the weight of the trailer when elevated does not tend to move the support 20 rearwardly.

The support as a whole is connected to and spaced from the carriage 18 by suitable means such as a pair of rods 48 so that the support and the carriage move forwardly and backwardly as a unit on the body frame of the trailer.

I have herein shown in a somewhat diagrammatic way a braking means for the trailer comprising a hand lever 49 pivoted at its lower end upon the trailer frame and connected by suitable linkage 50 to the brakes 51 on the rear axle of the trailer.

*Operation*

Assuming the structure to be in the assembled condition as shown in Fig. 1, the operation of disconnecting the tractor from the trailer is as follows: The operator moves the brake lever 49 to set the brakes, and raises the latches 39 to inoperative position. The tractor is then driven forwardly and in this movement the king pin 19 will draw forwardly the carriage 18 and the support 20. In its forward movement the support is caused to move downwardly on its inclined tracks until the wheels 21 engage the ground at which time a further forward movement of the support by reason of the camming action of the inclined tracks will cause the front end of the trailer to be gradually raised. In this movement the rear vehicle springs 15 of the tractor will assist in elevating the trailer until said springs have given up the power stored in them by the weight thereon. In Fig. 3 the support 20 is shown in full lines in its rearmost position and in dotted lines in its foremost position. The amount of deflection of the rear tractor springs 15 due to the trailer load is indicated roughly by the distance between the line $a$ representing the surface of the ground, and the dotted line $b$.

At the time the coupling jaws 33 arrive opposite the notches 35 in the guide frames 24 said jaws will be allowed to spread apart by entry of the wings 33$^a$ on the jaws into said notches, and the king pin 19 is then released from the jaws. At this time the trailer frame has been elevated free of the tractor and is being supported solely on the land wheels 21 so that the tractor may be driven away independently of the trailer. The length of the king pin between its upper flange and the circle 31 is such as to allow for vertical movement of the jaws 33 as the trailer is elevated by the supporting frame 20. The dog 36 has also been automatically engaged with the front cross piece on the trailer frame to hold the carriage 18 and the support 20 in their foremost position.

In the reverse operation of assembling the tractor with the trailer the tractor is backed underneath the trailer, whereupon the king pin 19 will engage the dog 36 and release it from the trailer frame to permit the carriage 18 to be moved rearwardly. In its further movement the king pin will strike the heels of the jaws 33 and enter the notch 23$^c$ in the carriage 18 and upon striking the base of the notch will move the carriage rearwardly. The wings 33$^a$ on the coupling jaws 33 will be forced out of the notches 35 to cause the jaws to close about the king pin, and in rearward movement the jaws will slide along the inner faces of the guide frames 24, maintaining the jaws closed.

The support 20, of course, moves rearwardly and upwardly along the inclined tracks 44 and 47 thereby gradually lowering the trailer frame onto the tractor. When fully supported by the tractor, continued rearward movement of the support 20 will raise it out of engagement with the ground until finally it is positioned a considerable distance rearwardly of the end of the tractor so as to be entirely out of the way.

When the carriage 18 approaches its rearmost position the shaft 27 engages and swings the latches 39 until the shaft passes the rear ends of said latches whereupon the latter drop in front of said shaft and lock the carriage in its rearmost position. Further rearward movement of the carriage is prevented by its engagement with stationary stops on the trailer frame. The trailer brakes are then released by means of the lever 49 and the vehicle as a unit is then completely coupled and ready to be driven away.

In some of the vehicles of this type in the prior art the point of pivotal connection between the trailer and the tractor has been located at the extreme forward end of the trailer frame. It will be noted that in my vehicle the king pin when the parts are finally coupled is located well rearwardly from the forward end of the trailer frame. With this arrangement a substantial portion of the load on the trailer may be located in front of the king pin so that if desired approximately one-half of the total load on the trailer may be borne by the rear traction wheels of the tractor, the other half, of course, being borne by the rear trailer wheels. This apportionment of the load has very important advantages, among which are the attainment of better traction of the rear traction wheels and the increase in the total load capacity of the trailer by reason of the relieving of the rear trailer wheels of a substantial portion of the load.

This advantage is obtained without sacrificing convenience in coupling and uncoupling the two sections of the vehicle by providing the slidable frame 18 which carries the coupling means to the extreme forward end of the trailer frame in uncoupling where it will be ready for easy recoupling.

In some of the claims I have referred to an element movably mounted on the trailer for performing a 'service operation.' This service operation is performed by the carriage and is specifically here the raising and lowering of the supporting member, but obviously it might perform some other work or service operation on the trailer.

I claim as my invention:

1. A combination vehicle of the character described comprising a tractor section, a trailer section, means mounted on one of said sections for coupling said sections together, said means being arranged to travel longitudinally on its carrying section, and means mounted on one of said sections and actuated by said travelling coupling means for causing elevation of said trailer section when said sections are being uncoupled and for causing the lowering of said trailer section when said sections are being connected.

2. A trailer having, in combination, a body frame supported at its rear end upon wheels, inclined guides carried by said body frame ahead of said wheels, and a structure carried by said body frame and movable as a unit forwardly and rearwardly along said frame, said structure comprising a portion having coupling means to connect with a tractor, and a trailer supporting portion arranged to move along said guides downwardly and forwardly as said structure moves forwardly, and rearwardly and upwardly as said structure moves rearwardly.

3. A trailer having, in combination, a body frame supported at its rear end upon wheels, a support for the forward portion of said body frame when detached from a tractor, and means operable by the tractor in withdrawing from the trailer or backing under the trailer for causing said supporting means to be moved into or out of engagement with the ground and thereby elevate or lower the front portion of the body frame.

4. A semi-trailer having movable means for supporting the forward end thereof when detached from a tractor, which means is operable by the tractor in withdrawing from or backing under the trailer to cause the trailer to be elevated as the tractor withdraws and to be lowered as the tractor backs under the trailer.

5. A trailer provided with a shiftable carriage having coupling means to connect with a tractor, and a land engaging wheel moved to raise and lower the trailer by the shifting of said carriage.

6. A trailer having coupling means mounted thereon to move bodily forward and back along the trailer, and a land engaging wheel moved to raise the trailer on forward motion of said means and to lower the trailer on rearward motion of said means.

7. The combination of a tractor having a king pin and circle at its rear end, a semi-trailer arranged to have its front end supported on said circle having coupling means comprising a pair of horizontally swinging jaws for engaging said king pin mounted on its forward portion and arranged to be slid forwardly and rearwardly by the tractor, means for locking the coupling means in its rear position, and means for holding the coupling means closed in any position other than its forward position and for permitting opening of the coupling means when in its forward position and allowing escape therefrom of said coupling element on the tractor.

8. The combination of a tractor having a coupling element at its rear end, a semi-trailer, coupling means movably mounted on the forward portion of the semi-trailer and arranged to engage said element on the tractor and be moved forward and back thereby, means for locking said coupling means in its rearmost position, means for locking said coupling means in its foremost position, and means for holding said coupling means in operative condition except when in its foremost position and for permitting movement of the said coupling means when in its foremost position to allow escape of said coupling element therefrom, the said means for locking said coupling means in its foremost position operating automatically to effect a lock and being operable automatically by the tractor when backing under the trailer to unlock said coupling means and permit rearward travel thereof.

9. The combination of a tractor, a semi-trailer, coupling means movably mounted on the trailer and shiftable forward and back thereon by the tractor, land engaging means on said trailer movable by said coupling means, and guiding means carried by said trailer to effect motion with a vertical component of said land engaging means, the operation of said land engaging means serving to remove the weight of the trailer from the tractor.

10. The combination of a tractor, a semi-trailer, coupling means mounted on the forward portion of said trailer arranged to coact with and be shifted forward and back relative to the trailer by a part on said tractor, and means carried by the trailer and operable in the shifting movement of said coupling means to raise or lower the forward end of said trailer out of or into operative relation to said tractor.

11. The combination of a tractor, a semi-trailer, means mounted on the trailer to travel forward and back, by which means the forward portion of said trailer is supported upon and coupled to said tractor, means for locking the first named means in fixed position, and supporting means actuated in the movement of said first mentioned means in the forward direction to raise the forward end of the trailer.

12. A trailer having, in combination, a frame, wheels supporting the rear end of said frame, an auxiliary support for the front end of said frame, said support being movable in a path inclined with respect to the frame, whereby the front of the trailer will be moved substantially in a vertical direction.

13. A trailer having, in combination, a frame, a wheeled support for one end of the frame, a second support for the other end of said frame, a pathway connected with the frame wherein the second support is movable, the motion of the support in the pathway being adapted to change the distance between the frame and the lower end of said second support.

14. In a trailer of the class described a coupling device comprising, a slidable member, a tapered notch adapted to receive a king pin moved thereinto, a semi-circular termination of the tapered notch adapted to pivotally receive the king pin whereby the moving king pin moves the sliding member, clamping jaws adapted to enclose the king pin on rearward motion of the sliding member, means to close the jaws and to permit opening of the jaws in the forward position of the sliding member, locking means for the sliding member and means to operate automatically said locking means.

15. In combination a semi-trailer and tractor, the tractor having a pivotal connecting means and a supporting circle, the trailer having a sliding member carrying a coupling device adapted pivotally to engage the pivotal means of the tractor, a part on the tractor being adapted to engage and slide rearwardly the sliding member on the trailer, means connected to the sliding member adapted to permit lowering of the trailer onto the supporting circle of the tractor, and means to lock the moving parts in their operative position.

16. A combination vehicle of the character described comprising, in combination, a tractor section and a trailer section, said trailer section being adapted to have its rear end horizontally stationary and its forward end vertically movable, a movable structure in the trailer section having its forward end movable with respect to the trailer section and its rear end vertically movable with respect to the trailer section, land engaging means carried by said structure whereby to raise the forward end of the trailer by a horizontal motion of the forward end of the movable structure, and means on the movable structure arranged to engage the tractor section whereby said structure will be actuated by relative horizontal motion between the trailer section and the tractor section.

17. A combined vehicle of the character described comprising, in combination, a tractor, a trailer for performing a service operation, an element movably mounted on the trailer, horizontally swinging jaws providing a connection between said element and the tractor while the tractor is being uncoupled from the trailer, the power of the tractor being thereby applied positively to actuate said element, said jaws operating automatically near the end of the uncoupling operation for rendering said connection ineffective after the service operation has been performed.

18. A combined vehicle of the tractor and semi-trailer type comprising, in combination, a tractor with a king pin, a trailer, an element movably mounted on the trailer, king-pin engaging jaw means for connecting said element and the tractor so that the element will be moved by the tractor while the tractor is being detached from the trailer, and means operating on jaw means to maintain the connection between the tractor and said element during the major portion of the uncoupling operation and to automatically release said jaw means from the king pin.

19. A combined vehicle of the character described comprising, in combination, a tractor, a trailer, an element movably mounted on the trailer, a supporting member carried by the trailer and operatively associated with said element, said member being arranged to be moved into a position to support the trailer when detached from the tractor, horizontally swinging jaw means to connect said element to the tractor whereby the power of the tractor will be applied positively to move said member into supporting position, and said guides for the jaw means operating automatically after said supporting member has reached its supporting position to release said connecting means thereby freeing said tractor from said element.

20. A combined vehicle of the tractor-semi-trailer type comprising, in combination, a tractor, a trailer, a carriage mounted to slide rearwardly during coupling and forwardly during uncoupling of the tractor and trailer, a king pin on the tractor, means on said carriage providing a coupling socket for receiving said king pin, and stationary cam means on the trailer arranged to hold said socket closed about the king pin during the uncoupling operation and to allow the socket to open automatically near the end of the uncoupling operation.

21. A combined vehicle of the tractor semi-trailer type comprising, in combination, a tractor, a trailer, a service element mounted on the trailer to move back and forth during coupling and uncoupling of the tractor and trailer, a coupling device on the tractor, a pair of movable oppositely facing jaws pivoted on said element and providing a socket for said coupling device, and guides for holding said jaws closed about said device during uncoupling and automatically releasing the jaws near the end of the uncoupling stroke.

22. A tractor and semi-trailer having, in combination, a tractor section, a trailer section, a king pin on one of said sections, a pair of movable jaws on the other section forming a socket for said king pin, and means controlling the opening and closing of said socket about said king pin upon relative movement between the sections.

23. A tractor and semi-trailer having, in combination, a tractor section, a trailer section, a king pin on one of said sections, jaw means on the other section providing a socket for said king pin, sliding means operating automatically upon relative movement between said sections to perform a service operation, and means for locking said sections in coupled relation.

24. In a semi-trailer, a locking device for locking the trailer to a tractor for drawing the same, comprising a reciprocable head, a pair of jaws pivoted to the head, guiding devices for guiding the head and jaws, these guide devices being such so as to cause the jaws to hold a locked position at one end of their movement, and permitting them to assume unlocked position at the opposite end of their movement, means for holding the head against reciprocation when the engaging members are in locked position and means connected to the head and extending toward the rear of the trailer for doing work.

25. A combined vehicle of the character described comprising, in combination, a tractor, a trailer, a coupling head mounted on the trailer to be moved back and forth respectively in the movement of the tractor in coupling to and uncoupling from the trailer, a member for supporting the forward end of said trailer when detached from the tractor, said member being connected to said head and adapted to be moved from inactive to active position in the forward movement of said head during uncoupling, a king pin on the tractor, a pair of horizontally swingable jaws pivoted on said head and cooperating to provide a forwardly opening socket for receiving said king pin, stationary guides on said trailer operable on said jaws to hold said socket closed during the rearward and forward movement of said head, said guides being shaped to permit opening of said socket after said supporting member has reached its active position, and means for locking said head in its rearmost or coupled position so that the pull of the tractor will be applied to the trailer through the medium of said coupling head.

26. A combined vehicle of the character described comprising, in combination, a tractor, a trailer, a support for the forward end of said trailer when detached from the tractor, and coupling mechanism by which said support is actuated and the tractive force of the tractor is applied to the trailer for drawing the same, said mechanism comprising a head connected to said support and mounted to move back and forth on the trailer by movement of the tractor in coupling to and uncoupling from the trailer thereby actuating said support, a king pin on the tractor, means on said head providing a socket for receiving said king pin, means operable to maintain said socket closed during the uncoupling stroke of said head until said support has been moved into active position and then to release said king pin automatically, and manually controllable means for locking said head in its rearmost position in the trailer during combined operation of the tractor and trailer.

27. A combined vehicle of the character described comprising, in combination, a tractor, a trailer, a coupling head mounted on the trailer to be moved back and forth in the movement of the tractor relative to the trailer in coupling to and uncoupling from the trailer, a vertical king pin on the tractor, a pair of jaws on said head adapted to provide a forwardly opening socket to pivotally receive said king pin, means to permit the opening and closing of said socket about the king pin, and means on the trailer providing a rearwardly diverging notch the edges of which are positioned to engage said king pin and guide the king pin into said socket as the tractor is backed under the trailer to couple thereto.

28. A combined vehicle of the character described comprising, in combination, a tractor, a trailer, a coupling head mounted on the trailer to be moved back and forth by the tractor in coupling to and uncoupling from the trailer, a vertical king pin on the tractor, means on said head adapted to provide a forwardly opening socket to pivotally receive said king pin, means operable in the movement of said head to permit the opening and closing of said socket about the king pin, said means being shaped to permit said socket to be opened in the foremost position of said head, and means on the trailer providing a rearwardly diverging notch the edges of which are positioned to engage said king pin and to guide the king pin into said socket as the tractor is backed under the trailer to couple thereto.

29. In a semi-trailer in which a tractor is arranged to be backed into a trailer to couple the two together and transfer the forward part of the trailer onto the tractor, one or more horizontally swinging jaws on one vehicle, a king pin on the other arranged to move the said jaws to closed position, means by which the jaws are held in position closed about the king pin including releasable devices to permit the king pin to open the said jaws, and a service member operated in the jaw movement to perform an automatic service operation on the trailer.

30. A tractor and semi-trailer having, in combination, a tractor section, a king pin and circle on said section, a trailer section arranged to swing on said circle and provided with one or more pivoted jaws forming a socket for said king pin, a service element connected with said jaws to move forwardly and backwardly when said king pin moves said jaws, and thereby perform a service operation upon said trailer.

31. In a tractor trailer combination wherein a tractor is adapted to be backed under the forward end of a trailer and coupled thereto, and a movable support is adapted to support the forward end of a trailer when detached from the tractor;—tractor controlled means for raising and lowering the said support and securing it in either position, said means including a member articulated with the support and adapted to be actuated by the tractor, and a latch mechanism carried by said member and adapted to be actuated by the tractor in advance of said member to release the member so that the tractor may actuate the member to raise said support when backing under the trailer.

32. A tractor trailer combination as called for in claim 31, and means on said member engageable by the tractor adapted to pull the member and cause the movable support to be lowered.

33. In a tractor trailer combination wherein a tractor is adapted to be backed under the forward end of a trailer and coupled thereto, and a movable support is adapted to support the forward end of the trailer when detached from the tractor;—a member and latch mechanism operatable by the tractor for adjusting the movable support and securing it in an adjusted position, said mechanism including a member articulated with the movable support, means on the forward end of said member engageable with the tractor part so that said member may be pulled forward by the tractor to adjust the movable support, and a latch device controlled by the tractor part for securing the member in an adjusted position.

34. In a tractor trailer combination wherein a tractor is adapted to be backed under the forward end of a trailer and coupled thereto, and a movable support is adapted to support the forward end of the trailer when detached from the tractor; tractor controlled means for lowering the movable support, said means including a member articulated with a movable support and adapted to be automatically coupled to the tractor and released therefrom so that as the tractor pulls away from the trailer the member is actuated to lower said support, and a latch mechanism associated with the member and adapted to secure the support in a lowered position.

35. In a tractor trailer coupling wherein a coupler head is adapted to receive a coupling pin located on the tractor, a pair of pivoted knuckles arranged to cooperate with the coupler head and close around the coupling pin and spread to release the coupling pin, and means by which the knuckles are both kept locked about the coupler pin as the coupler pin moves into engagement with and actuates the knuckles, the said coupler head, the said knuckles and the said means being arranged so that either knuckle may hold the pin during service activity independent of the other knuckle to maintain service activity in the presence of disablement of either knuckle.

36. In a tractor trailer combination wherein a tractor is adapted to be backed under the forward end of a trailer and coupled thereto, means for supporting the forward end of the trailer when detached from the tractor including a latch for holding the same in supporting position and adapted to be actuated and released by the tractor in advance of actuation of the support so that the tractor may actuate said means to raise the supporting part to the non-supporting position when the tractor is backed under the trailer.

In testimony whereof, I have hereunto affixed my signature.

ADDI BENJAMIN CADMAN.